Dec. 5, 1950     G. E. MAILLAT     2,532,416
STANDARD ELECTRIC METER PROVIDED WITH
PORTABLE STROBOSCOPIC DEVICE
Filed April 9, 1946     3 Sheets-Sheet 1
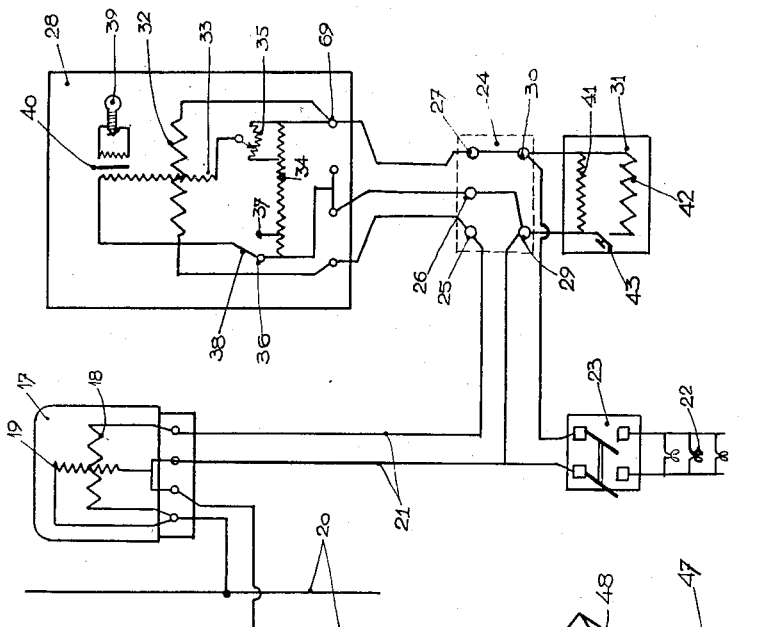
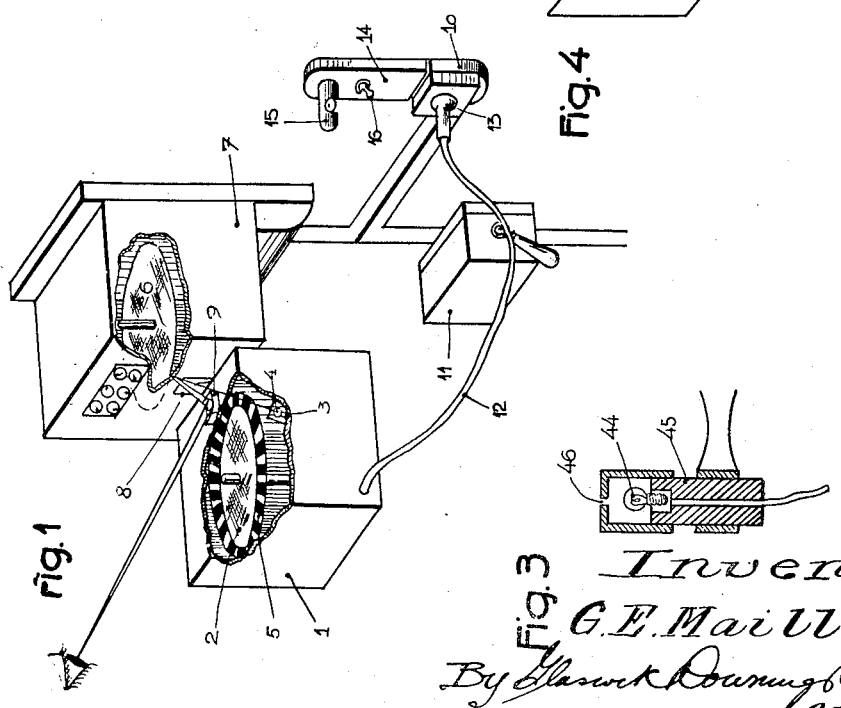
Inventor
G. E. Maillat
By Glaswick Downing Seibold
Attys Dec. 5, 1950 G. E. MAILLAT 2,532,416
STANDARD ELECTRIC METER PROVIDED WITH
PORTABLE STROBOSCOPIC DEVICE
Filed April 9, 1946 3 Sheets-Sheet 2

Inventor
G. E. Maillat
By Glascock Downing Ruckle
Attys

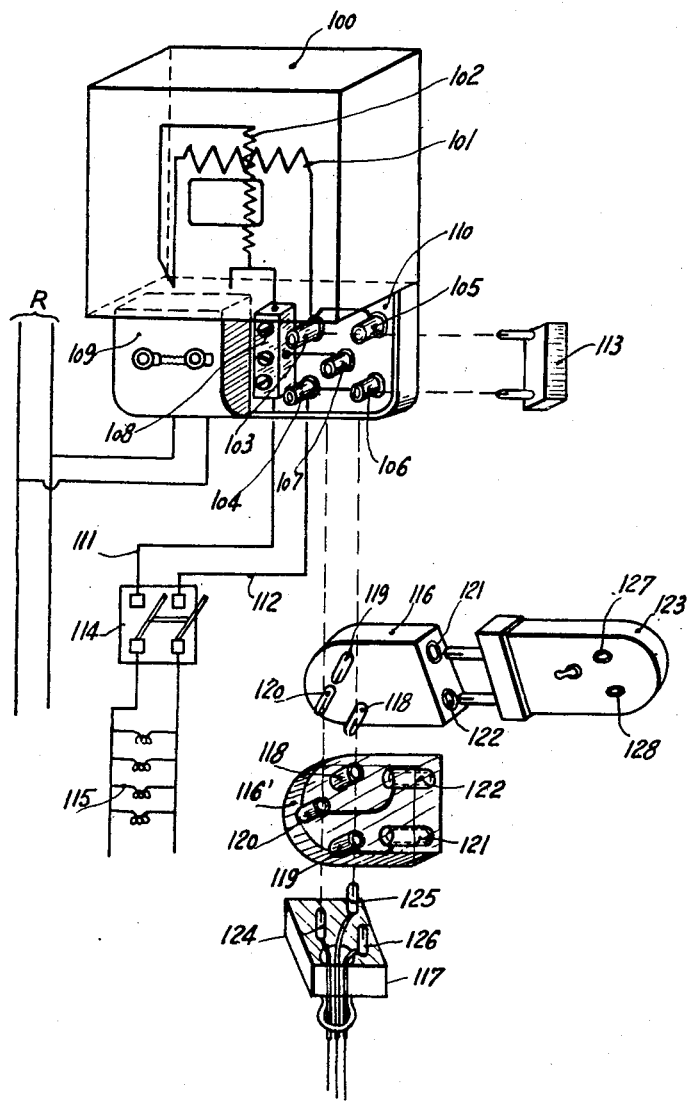

Patented Dec. 5, 1950

2,532,416

UNITED STATES PATENT OFFICE 2,532,416

STANDARD ELECTRIC METER PROVIDED WITH PORTABLE STROBOSCOPIC DEVICE

Gustave Ernest Maillat, Seine-et-Oise, France, assignor to Electricite de France, Paris, France, a body corporate of France Application April 9, 1946, Serial No. 660,593
In France March 3, 1944

Section 1, Public Law 690, August 8, 1946
Patent expires March 3, 1964

2 Claims. (Cl. 175—183)

The invention exposed hereinafter has for its object an improvement relating to standard electric meters provided with a stroboscopic device in a portable case, in particular to the meters designed previously by the same inventor for a quick verification on spot of relative errors in electric induction meters belonging to low tension systems.

This improvement has for its main objective the rendering of the portable apparatus still lighter and more convenient in use, thanks to a number of modifications.

The chief modification relates to the stroboscopic device.

The known principle of the stroboscopic verification method consists in placing the standard meter in the same electric conditions as the subscriber's meter and in confirming by use of the stroboscopic method that the guidemarks of their respective discs rotate at the same speed. For this purpose, the disc of the subscriber's meter is provided on its lower face with a circumferential graduation; the disc of the standard meter, furnished on its edge with a comb, or with teeth, having an equal number of steps with the subscriber's graduation, is interposed in a track of a luminous beam falling on the said lower face of subscriber's meter disc; the standard disc gives thus rise to luminous modulations which cause an apparent immobility due to stroboscopic effect, at the moment when the modulation frequency is equal to the displacement rate of the graduation marks of the subscriber's meter disc. The observation of this graduation is effected through an aperture in the meter case which delimits only a small area of the graduation, for example 1 cm. approximately, the number of graduation lines per centimeter is high, e. g. 30 to the cm.

In the earlier instruments, mentioned above, the author has foreseen an illumination of the subscriber's disc by a limited number of light beams produced by a small lamp and a stationary comb teeth, placed immediately below the edge of the standard meter disc, this edge being formed by a photographic film having a circular graduation identical with that of the comb. This film, when rotating, intercepted or passed the group of luminous beams, which were received then by an optical glass instrument producing on the lower face of the subscriber's meter disc a diffused illumination, modulated by the rate of displacement of the standard meter disc graduation. When the two rotation speeds were equal, the subscriber's meter disc appeared to be stationary.

This stroboscopic device exhibited several drawbacks, in particular the following:

1. The optical glass device needed was relatively heavy and expensive.

2. To obtain an illumination on the subscriber's meter disc formed as one diffused area and not as separate luminous areas corresponding to the light beams, it was necessary to have the distance between the subscriber's meter disc and the stroboscopic devices of the standard meter of a definite determined value and what follows the case of the standard meter fitted at a definite determined position in respect to the meter to be verified. A special device for connecting and branching in of the standard meter case circuits was, therefore, needed.

The improvement in the stroboscopic device according to the present invention overcomes these drawbacks.

It is characterized by the fact that the stroboscopic device is reduced to a point light source projecting directly, without the use of optical glasses, a shade of the standard graduation thrown clearly on the subscriber's graduation, these two graduations rotating either in the same direction or in the opposite direction.

The shade of the standard comb is projected on the disc graduation of the meter to be verified with a magnification in the proportion of 3:1 or of 4:1, in a way that 3 or 4 graduation marks of the disc to be verified appear between the shades of two successive marks of the standard graduation. As result of this magnification, the circumferential speed of the shade thus projected is about three or four times higher than the circumferential speed of the disc of the meter to be verified, the successive sweepings in the vision field of the large black marks constituted by the shades of the marks of the standard graduation, produce an effect equivalent to that of periodic illumination interruptions used for stroboscopic effects.

The observation shows as a matter of fact that in these conditions, if the displacement rates of the two graduation marks are equal, the graduation of the subscriber appears to be stationary, whereas if they differ from one another, this graduation seems to rotate in one or in the other direction according to the sign of the difference.

The chief advantages of this device represent the elimination of optical glasses and of the stationary comb, resulting in weight decrease and economy, as well as in suppressing the necessity of placing the standard meter in an exact position in respect to the subscriber's meter; in these conditions the standard apparatus may be held in hand as is held a pointing photographic camera.

The present invention comprises, moreover, other arrangements, which tend to render the device more readily portable and more convenient in use; these arrangements are described hereinafter in application to one particular embodiment of the standard meter.

The standard meter more particularly being no longer designed to be fitted on a control plate which ensures at the same time its branching to the line, is provided with connections, which can be made by means of a special contact having the chief advantage of permitting to place the standard resistances outside the standard meter box and thus allowing a further decrease in weight.

For example's sake an apparatus according to the invention was described hereinafter and shown on the accompanying drawings; it was designed to enable a quick verification of the monophase induction meters as used for low tension. In the case taken as example, the meter to be verified is identical to the standard meter contained in the stroboscopic apparatus.

Fig. 1 shows in perspective view the device according to the invention, connected to the special contact, as mentioned above, and placed in the operating position in front of the meter to be verified.

Fig. 2 gives a diagrammatic view of the connections and the inner structure of the device according to the invention.

Fig. 3 shows in axial longitudinal section the projection lamp and the box where it is lodged.

Fig. 4 shows the window provided with an indicator, arranged in the front wall of the subscriber's meter box; this window allows to observe the displacement of the circumferential graduations traced on the lower face of the subscriber's meter disc.

Fig. 6 shows in a way similar to that of the Fig. 5 a different arrangement of the current contact.

Figure 5:
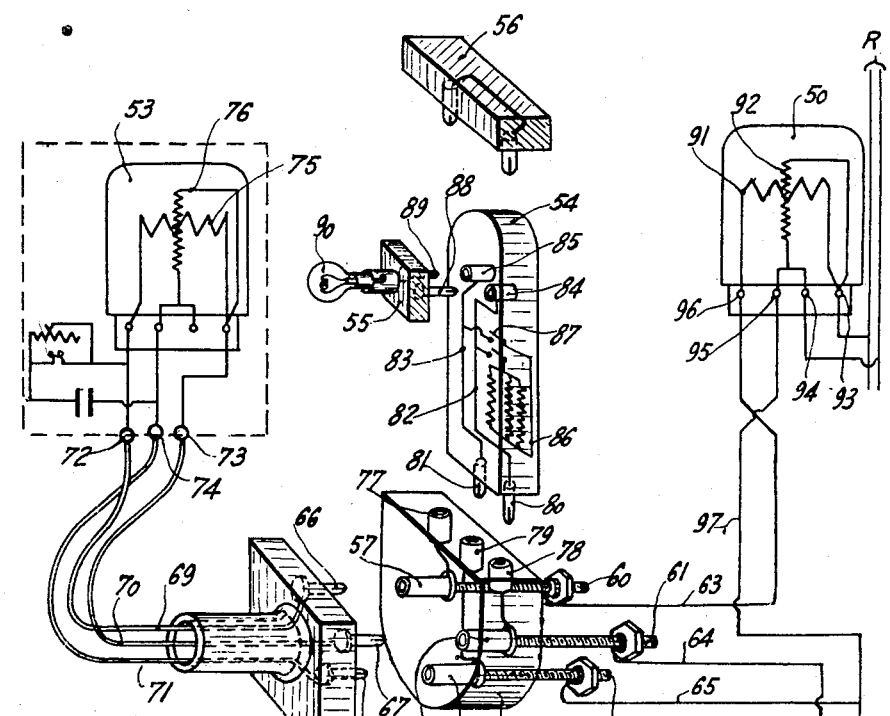
Fig. 5 shows in detail the disposition of the elements of the subscriber's meter, of the standard meter and of the contact.

In Fig. 1, the device according to the invention is shown in the box 1, in which only the disc 2 of the standard meter and a small electric lamp 3 fitted in a diaphragm case 4 are shown.

The disc 2 carries on its rim a circular photographic film 5 on which are impressed uniformly distributed black radial bands, which are of the same width as the intermediate translucide portions. (In the figure the graduation proportion has been considerably exaggerated.)

The above mentioned luminous source 3 placed tilted below the disc 2, illuminates a small film area 5, the shade of which is projected on to the lower edge side of the graduated disc 6 of the meter which has to be verified, through a window 8 arranged in the front wall of the box. In the present case the number of the equidistant radial marks of the disc graduation is equal to the number of blacks in the film 5.

The luminous beams which crossed the window in going in are diffused by the disc 6 and are partially reflected through this window. They arrive at the operator's eye after being reflected in a concave mirror 9 fixed on the box 1. In case where the device according to the invention is placed higher than shown in Fig. 1, at the height of the operator's eye, a small flat mirror (not shown in drawing) will be used to send the beams back to the eye; it will be placed suitably above the said concave mirror, and forming a periscope with it.

The device is connected to a special contact 10 (fixed above the subscriber's main switch 11) through a three conductor cord 12 and a multiple plug 13, inserted in the socket 10. The control resistance 14 is branched to the same socket. It allows a very short of needed magnitude output just necessary for the verification to pass through the meter, and comprises for this purpose a small high resistance lamp 15, connected in parallel with it. The operation of the switch 16 allows the lamp 15 to remain alone in circuit.

According to Fig. 2 showing diagrammatically the connections corresponding to the device in Fig. 1, the meter to be verified 17 comprising an intensity winding 18 and a tension winding 19, is branched to the line 20 by two inlet terminals. From this meter 17 on starts the main subscriber's line 21, supplying the receivers 22 through the main switch 23.

The above mentioned special current contact 24 is connected in parallel to the main subscriber's line, above the main switch 23.

It comprises chiefly three terminals 25, 26, 27 for branching in of the stroboscopic verification device 28 and two terminals 29, 30 for branching in of the removable resistance elements 31 (shown by 14 in Fig. 1).

The device according to the invention consists, as was explained above, of a stroboscopic observation device and a standard meter. In the Fig. 2 are represented the intensity 32, and tension windings 33 of this meter. The latter windings is fed through a potentiometer 34 connected to the terminals 26 and 27 of the contact 24. One end of this potentiometer is shunted by a rheostat 35, the steps of which are calibrated as will be explained below. The other end of the potentiometer presents two adjustment terminals 36 and 37 and a movable arm 38. By placing the arm 38 on the terminals 36, a current higher by 3% than the normal current, corresponding to the pressure applied to the circuit terminals, passes through the tension winding 33. By placing the arm on the terminal 37, a current 3% lower than the normal current as defined above is obtained. The small electric lamp 39 (shown by 3 in Fig. 1) is supplied by a small transformer 40, the primary of which is formed by the tension winding 33 of the standard meter.

The removable resistance element 31 comprises two resistances in parallel. One, very high, 41, may be constituted by a small lamp (shown by 15 in Fig. 1); it will absorb a negligible current. The other resistance 42 is chosen by the verifying operator to obtain suitable working conditions for the verification of the two meters. The switch 43 (shown by 16 in Fig. 1) allows a short working time of a few seconds only of the resistance 31 (the verification time). This very light resistance of the electric iron type, being enclosed in a tight box cannot be, in effect, held longer than a very short time in circuit.

In low-tension meters, the error of recorded different loading conditions ought not over top the given maxima and minima (usually ±3%).

The verification will then consist in giving to the standard meter, with help of the switch 38, and for each of the load conditions required for the verification, a relative error equal to +3% or —3% respectively, and in comparing, in each case, the working of the two meters. This comparison will be effected by means of the disc velocity comparison according to the stroboscopic method described above. In case when the meter under examination works within the admissible error limits, it ought then at any load conditions rotate slower than the standard meter, when the arm 38 is on the step 36 (relative velocity increase +3%) and rotate faster than the latter when the arm is on the step 37 (relative velocity decrease —3%). After the verifying attendant has suitably adjusted the rheostat 35 and inserted the resistance 42 to obtain the required working conditions for the verification, he will operate the arm 38 as was said above. For each of the arm positions, 36 and 37, he will observe the relative movement of the graduation of the disc 6 (Fig. 1) belonging to the meter to be verified.

If the meter to be verified is well adjusted, the graduation of the disc of the meter under test will appear to move, during the first test, in the opposite direction to its real motion. On the contrary, during the second test, it will be seen to move in direction of its real movement. To carry out a similar verification at very light load, it suffices to open the contacts 23 and 43. The very high resistance 41 is then alone in circuit, connected to the terminals of the meter.

For verification by use of the standard apparatus 28 of induction meters whose constants per revolution (the amount of energy recorded per revolution) are different from those of the standard meter, it is, of course, necessary to have the number of equidistant radial marks traced on the lower face of the respective discs, in contradiction to what was foreseen hereinbefore, different from the number of teeth in the standard meter film. Give, for example, a consumer's meter of 5 amperes under 110 volts to verify, the constant per revolution of which is 0.8 watt-hour (that is to say the meter records 0.8 watt-hour per revolution) with help of a standard meter of 5 amperes under 110 volts, whose constant per revolution is 1 watt-hour and whose disc has 520 circumferential teeth.

If the meter to be verified is exactly adjusted for the predetermined working conditions, the graduation of this disc observed by means of the above described apparatus will appear to be stationary if the numbers of marks on the two discs are proportional to their constants per revolution, it means if, in the first case, the number of marks of the disc under test will be equal to 520×0.8=416. As the figures thus obtained do not correspond to a convenient disc graduation, a graduation of 400 marks will be used with a following reduction of standard meter disc speed obtained by the operation of the rheostat 35 for the verification of the working of this type of meter. This rheostat is calibrated corresponding to the constants per revolution of the meter that will undergo the verification of the attendant.

As shown in Fig. 3, the lamp 44, of the type used in the electro-medical apparatus, is situated in a cylindrical box 45, the top of which being of considerable thickness is holed at its center by a circular aperture 46 having few tenths of millimeter in diameter. This arrangement gives the required point source of light. The image of the graduation 5 projected by means of this pointlight is perfectly clear and sharp.

Fig. 4 shows the shape of the window 47, provided with a blackened passage 48, which allows to observe the graduation illuminated by means of the lamp 44 even when operating in full sun light.

In Fig. 5 which shows the embodiment of the contact as represented diagrammatically in Fig. 2, the consumer's meter under test, connected to the network R is denoted by 50, the base of the contact by 51, the corresponding multiple plug by 52, the standard meter provided with the stroboscopic device by 53, the removable resistance by 54, the lamp support by 55 and a connecting piece by 56. To show the inner connections of these members, they are represented as if transparent.

The base 51 exhibits on its front face three main sockets 57, 58, 59 constituting an extension of threaded pins serving, on the one hand, to fix the base to the supporting board, on the other hand to connect the sockets to the inlet leads 63, 64, 65 of the meter 50, the multiple plug 52 carries three plugs 66, 67, 68, fitting in the sockets 57, 58, 59 respectively. These plugs 66, 67, 68 are connected to the leads 69, 70, 71 respectively, which leads form a flexible cord terminating at the stroboscopic verifying apparatus 53, the inlet terminals of which are shown by 72, 73, 74. This apparatus comprises a standard meter whose intensity winding is denoted by 75 and the tension winding by 76.

The three main sockets 57, 58 and 59 are connected to the auxiliary sockets 77, 78, 79 respectively and are situated on the upper face of the base 51. Into the sockets 77 and 78 can be fitted the two plugs of the connecting piece 56, whereas into the sockets 78 and 79 can be inserted plugs 80 and 81 of the resistance element. These plugs 80 and 81 are connected through the leads 82 and 83 to the sockets 84 and 85 respectively, these sockets being situated in the upper part of the said element 54. The lower part of this element contains a standard resistance, diagrammatically represented at 86, of the electric iron type and connected in parallel to the leads 82 and 83. A double-pole interrupter 87 branches in or disconnects the resistance 86 circuit.

For test purposes use is made of a set of elements 54, which differ between themselves only by magnitude of their resistances 86. The resistances 86 range, for example, from 50 watts up to 500 watts, or even 1000 watts for some heavy load meters.

Into the sockets 84 and 85 of the resistance box 54 enter the plugs of the lamp support 55, the filament 90 of this lamp being of very high resistance.

The distance between the plugs 88 and 89 is equal to that between the plugs 80 and 81, the support lamp 55 may thus be connected either to the resistance element 54, or to the base 51.

The subscriber's meter 50 under test comprises an intensity circuit 91 and a tension circuit 92. Its inlet terminals are denoted by 93, 94, its outlet terminals by 95 and 96, the phase conductor by 63, the neutral conductor by 97, the main subscriber's interrupter by 98 and consumer's circuit by 99.

When not under test, the connecting piece 56 is plugged into the sockets 77 and 78 of the base 51, it ensures the continuity of the conductor 63 supplying the consumer's installation. The verification of the meter 50 exhibits a double character. Firstly, it aims to ensure that the maximum error at light, medium and heavy load does not exceed, in plus or in minus, a predetermined percentage; for this verification sake the stroboscopic standard meter is adjusted. Secondly it allows to ensure that the meter works for a very small intensity of the order of 1/50 of the normal current. To set the standard meter in working conditions, the multiple plug 52 is put in first of all, the connecting-piece 56 is then taken out.

Thus the branching in is effected without the subscriber's receiving circuit being cut. The verification of the percentage error magnitude of the consumer's meter begins.

Three cases may occur:

*First case*—The installation is only under pressure, the load being zero.

*Second case*—Consumer absorbs a medium charge.

*Third case*—Consumer absorbs a heavy load, sufficient to carry out the corresponding test.

To carry out the test in the first case (installation under pressure only) for the heavy load, a suitably chosen resistance element 54 is inserted in the base 51, the switch of which 87 is open. The support-lamp 90 is then plugged in this resistance element. By closing the switch 87, the resistance 86 causes a high intensity output in the meter 50 required for the verification. But the operation of the interrupter 87 of the element 54 enables the branching in to be effected in minimum time (8 to 10 seconds) necessary for the test purposes, this is indispensable as the resistances 86 are very light and, consequently, fragile. The flow of the current passes the following circuit: arriving from the terminal 96, it passes into the phase conductor 63, through socket 57, conductor 69, in the winding 75 of the standard meter, exits out of this winding through the terminal 73, the conductor 70 and the socket 58. It passes then entirely through the socket 78 and the conductor 82 and there into two resistances 86 and 90 mounted in parallel. It flows through the conductor 83, the socket 79, the socket 59, conductor 65 and the neutral conductor 97 towards the meter 50. The resistance of the lamp 90 being very high, it has no practical influence in the adjustment of the loads of the two meters. By allowing a very weak current to flow when the interrupter is open, the lamp prevents the passage of any violent extra currents of opening and of closing in the meters, when they are branched in or disconnected by the interrupter 87, mounted in the element 54.

To carry out the medium and light load tests, use is made of other elements such as 54, by inserting each time the lamp-support 55. To carry out a very light load test (starting of the meter) it is sufficient to open the interrupter 87.

In the second case (consumer's medium load), the heavy load test is carried out by insertion of an element 54 whose resistance 86, put in parallel with the resistances 99, gives the over-all load necessary for effecting of the verification. The medium and light load tests are carried out together with reception apparatus 99 of the consumer. The very light load test is effected by opening of the subscriber's interrupter 98 and with help of the lamp-support 55, plugged in directly in the base 51.

In the third case (consumer's heavy load) the heavy load test is carried out directly.

The lamp-support 55 being attached directly to the socket base 51, the very light load test will be carried out, moreover, by opening the main interrupter 98.

When the verification observations are finished, the connecting piece 56 is replaced and the multiple plug 52 taken out.

Fig. 6 shows, in an arrangement similar to that of the Fig. 5, another form of the socket base situated in the meter's terminal box. This base is used together with a triple plug, identical to the plug 57 in Fig. 5.

This Fig. 6 shows a meter 100 to be tested, its intensity winding 101, its tension winding 102. The outlet of the winding 101 is connected to the phase conductor 112 by means of sockets 103 and 104 which may be connected together or isolated from one another with help of the removable connecting-piece 113. The outlet of the tension winding 102 is connected to the neutral conductor 111 by means of the terminal 108. The main interrupter of the subscriber is shown at 114, its resistance elements at 115.

The meter's 100 terminal box is divided into two compartments separated from each other by a partition. The compartments 109 on the left, comprising the inlet terminals is covered by a sealed top for preventing any theft of power by tapping in front the meter; the other compartment 110 is provided with a hinged cover (not shown).

The compartment 110 comprises, moreover, the sockets 103 and 104, three other sockets 105, 106 and 107 which are connected to the sockets 103, 104 and 108 respectively, are the main sockets of the socket base and serve for branching in of the measurement apparatus; the sockets 103 and 104 in which can be inserted, as was mentioned already, a connecting piece 113, are auxiliary base sockets.

To be able to branch in the measurement apparatus and the circuits indispensable for its operation, use is made of a plug-socket member 116 identical with that 51 in Fig. 5, which is interposed between the main sockets and the multiple plug 117. This plug-socket block is shown in Fig. 6 under two different forms:

(a) View from below (upper figure), the block contact being tilted;

(b) Plan view (lower figure); the block contact is shown as transparent.

Each of the three plugs 118, 119, 120 of this plug-socket block (upper fig.) forms a common member with the corresponding socket of the same denoting number (lower fig.).

The sockets 121 and 122 connected to the sockets 119 and 120 respectively are also situated in the block and are used for branching in of control elements such as 123. By comparing Figs. 5 and 6, the following relationship between the sockets of the base 51 (Fig. 5) and those of the block 116 (Fig. 6) can be noticed.

The socket 118 in Fig. 6 corresponds to the socket 57 in Fig. 5.

The socket 119 in Fig. 6 corresponds to the socket 58 in Fig. 5.

The socket 120 in Fig. 6 corresponds to the socket 59 in Fig. 5.

The plugs 124, 125, 126 of the multiple plug 117 of the standard stroboscopic meter enter into the sockets 120, 119, 118 respectively. A resistance element 123 identical with the element 54 in Fig. 5 is plugged in on the side of the triple plug-member 116. The depth of the terminal box of the meter does not allow to locate there a socket base, whose side would be accessible for introduction of a resistance element 123; for this reason a member 116 provided with main and auxiliary sockets and fitting in the sockets 105, 106, 107 of the meter terminal box was designed in a manner to remain outside the latter and to have its auxiliary side sockets 121, 122 readily accessible. The distance between the sockets 127 and 128 of this element is equal to that of the sockets 121, 122, in such a way that the lamp-support (not shown in Fig. 6) (identical to the lamp-support 55 in Fig. 5) may be plugged either in the element 123, or in the auxiliary member 116. The verification tests of the meter are executed as was explained already. For example's sake, the case of a monophase meter was taken in the preceding description, though the invention is not limited to this simple case.

As a summary indication, it will be shown how operates a socket base for a low-tension three-phase meter connected to the network by three non-balanced conductors. Such a meter is provided with two intensity and two tension windings. Its verification by an identical type meter will necessitate the provision in the socket member of disconnections according to the invention of the two phase conductors and a connection to the third conductor; each disconnection will comprise four sockets: two for the connecting-piece, two for the branching in of the apparatus, the third conductor connection will comprise one socket.

The socket member, making object of the invention, may, for example, be designed for verification tests of all meters belonging to the multiple phase low-tension networks, irrespectively of the adopted distribution system and the number of phases.

In the case where the device is not only required for vertification purposes but for the calibration of the meters, this device will be attached on the cover case of the meter to be calibrated by any suitable connecting means, in the same position as occupied during the test or when held in hands, this arrangement permitting the operator to carry out the adjustment of the meter to be calibrated when working, without the need to stop or disconnect the stroboscopic device. In which case, the necessary connections between the stroboscopic device and the meter may be effected by means of one cord only, by inserting directly in the sockets of the terminal box (Fig. 6) plugs integral with the box of the stroboscopic device.

Figure 7:
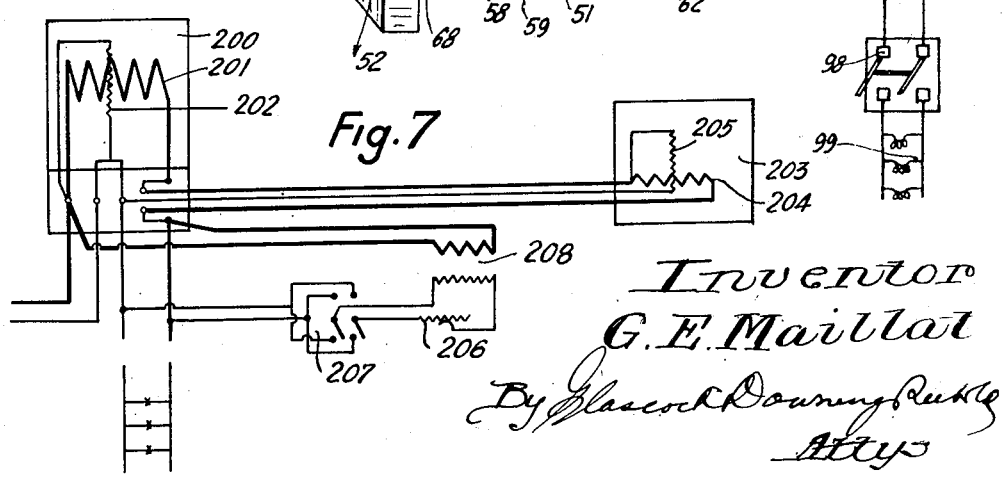
Fig. 7 shows a different arrangement designed to be used for as a meter calibration device.

As shown in Fig. 7, the different calibration loads necessary for the calibration are obtained by means of a small transformer rheostat. In this figure, the meter to be calibrated is denoted by 200, its intensity winding by 201, its tension windings 202, 204 and 205 denote the corresponding windings of the standard stroboscopic meter 203. A transformer 208 fitted on its primary with a rheostat 206 is supplied from any suitable point of the installation, for example through a switch 207 enabling to disconnect the rheostat. The secondary of the transformer is branched, for example, by means of simple tappings, between the terminals of the intensity winding 201 of the meter 200. Under these conditions the current intensity in the intensity windings of the two meters is determined by the difference of the intensity absorbed by the consumer and the intensity resulting from the induced tension in the transformer's secondary 208, which is adjusted by the rheostat 206.

A differential arrangement is thus obtained permitting to place the two meters in required conditions for calibration at any input absorbed by the subscriber, and even to carry out a reversed test to examine the working condition of the mechanical members of the meter.

The transformer rheostat being of low power, of the order of 4 to 5 volt-amperes and having very small dimensions, it may be fixed inside or on the outside of the stroboscopic device box.

What I claim is:

1. A stroboscopic device for checking and adjusting, by means of a standard meter, a service meter having a disk, radial graduation marks on the edge of the lower face of said disk, a window on the front of a casing containing said service meter for observing said graduation marks and means for readily connecting the standard meter to the meter to be checked, wherein the said standard meter comprises a casing, a disk rotating at the same angular speed as the disk of the service meter, alternately translucid and opaque radial graduation marks of equal width on the periphery of said standard meter disk, a punctual source of light positioned under the last said disk for throwing over the lower face of the disk of the meter to be checked enlarged images of said opaque and translucid marks.

2. A stroboscopic device for checking and adjusting, by means of a standard meter, a service meter inserted between a supply network and a consuming network and having a disk, radial graduation marks on the edge of the lower face of said disk, a window on the front of a casing containing said service meter for observing said graduation marks, a first compartment in the lower part of said casing comprising the connections of a current circuit and a potential circuit of the service meter with the supply network, a second compartment in the lower part of said casing comprising two sockets connected respectively to the free ends of said circuits, two sockets connected respectively to the terminals of the consuming network, a first bridge-connection between the socket connected to the free end of the potential circuit and the socket connected to one terminal of the consuming circuit, a second bridge connection between the socket connected to the free end of the current circuit and the socket connected to the other terminal of the consuming circuit, a last socket connected to said second bridge, wherein the said standard meter comprises a casing, a disk rotating at the same angular speed as the disk of the service meter, alternately translucid and opaque radial graduation marks of equal width on the periphery of said standard meter disk, a punctual source of light positioned under the last said disk for throwing over the lower face of the disk of the meter to be checked enlarged images of said opaque and translucid marks, a 3-wire lead connected to the current and potential circuits of the standard meter, and a plug at the free end of said lead having three pins cooperating respectively with the last socket on the second of said bridge and with the sockets of the said first bridge.

MAILLAT, ERNEST GUSTAVE.

REFERENCES CITED

The following references are of record in the file of this patent:

UNITED STATES PATENTS

| Number | Name | Date |
|---|---|---|
| 905,966 | Wilkins | Dec. 8, 1908 |
| 1,427,776 | Blathy | Sept. 5, 1922 |
| 1,864,771 | Sparkes | June 28, 1932 |
| 2,123,115 | Maillat | July 5, 1938 |
| 2,267,282 | Larson | Dec. 23, 1941 |